US011231769B2

(12) United States Patent
Ehmann et al.

(10) Patent No.: US 11,231,769 B2
(45) Date of Patent: Jan. 25, 2022

(54) SEQUENCER-BASED PROTOCOL ADAPTER

(71) Applicant: FACEBOOK TECHNOLOGIES, LLC, Menlo Park, CA (US)

(72) Inventors: Gregory Ehmann, Sleepy Hollow, IL (US); Drew E. Wingard, Palo Alto, CA (US)

(73) Assignee: FACEBOOK TECHNOLOGIES, LLC, Menlo Park, CA (US)

(*) Notice: Subject to any disclaimer, the term of this patent is extended or adjusted under 35 U.S.C. 154(b) by 483 days.

(21) Appl. No.: 16/190,944

(22) Filed: Nov. 14, 2018

(65) Prior Publication Data

US 2019/0079578 A1 Mar. 14, 2019

Related U.S. Application Data

(63) Continuation-in-part of application No. 15/912,934, filed on Mar. 6, 2018, now Pat. No. 10,921,874.
(Continued)

(51) Int. Cl.
*G06F 1/32* (2019.01)
*G06F 1/3296* (2019.01)
(Continued)

(52) U.S. Cl.
CPC .............. *G06F 1/3296* (2013.01); *G06F 1/10* (2013.01); *G06F 1/26* (2013.01); *G06F 1/28* (2013.01);
(Continued)

(58) Field of Classification Search
CPC ............................... G06F 1/324; G06F 1/3296
See application file for complete search history.

(56) References Cited

U.S. PATENT DOCUMENTS

| | | | |
|---|---|---|---|
| 4,189,767 | A | 2/1980 | Ahuja |
| 5,708,659 | A | 1/1998 | Rostoker et al. |

(Continued)

FOREIGN PATENT DOCUMENTS

| | | |
|---|---|---|
| CN | 111630471 | 9/2020 |
| EP | 3593225 | 1/2020 |

(Continued)

OTHER PUBLICATIONS

U.S. Notice of Allowance dated Oct. 16, 2020 in U.S. Appl. No. 15/912,934.

(Continued)

*Primary Examiner* — Albert Wang
(74) *Attorney, Agent, or Firm* — Weaver Austin Villeneuve & Sampson LLP

(57) ABSTRACT

Methods, Apparatus, and Systems are discussed for a sequencer-based protocol adapter that executes a limited instruction set. The sequencer-based protocol adapter is implemented in electronic hardware and programmable registers in an integrated circuit and configured to transition a set of 1) one or more voltage sources, 2) one or more frequency sources, or 3) a combination of voltage sources and frequency sources, coupled with that sequencer-based protocol adapter. The sequencer-based protocol adapter manages power on the integrated circuit, via receiving a desired performance index at an input and then executing one or more of the limited instructions stored in the programmable registers in a proper sequence of steps in order to transition the coupled voltage sources and/or frequency sources from a current operational state to a desired operational state. Note, the desired operational state the coupled voltage sources and/or frequency sources corresponds to the received desired performance index.

20 Claims, 6 Drawing Sheets

Related U.S. Application Data

(60) Provisional application No. 62/587,711, filed on Nov. 17, 2017, provisional application No. 62/467,617, filed on Mar. 6, 2017.

(51) Int. Cl.

| | |
|---|---|
| ***G06F 9/30*** | (2018.01) |
| ***G06F 1/324*** | (2019.01) |
| ***G06F 1/28*** | (2006.01) |
| ***G06F 1/3234*** | (2019.01) |
| ***G06F 1/26*** | (2006.01) |
| ***G06F 1/10*** | (2006.01) |

(52) U.S. Cl.
CPC ............ *G06F 1/324* (2013.01); *G06F 1/3234* (2013.01); *G06F 9/30101* (2013.01)

(56) References Cited

U.S. PATENT DOCUMENTS

| | | | |
|---|---|---|---|
| 5,781,918 | A | 7/1998 | Lieberman et al. |
| 5,860,159 | A | 1/1999 | Hagersten |
| 6,487,621 | B1 | 11/2002 | MacLaren |
| 7,120,765 | B2 | 10/2006 | Dodd et al. |
| 7,155,554 | B2 | 12/2006 | Vinogradov et al. |
| 7,194,561 | B2 | 3/2007 | Weber |
| 7,243,264 | B2 | 7/2007 | Weber et al. |
| 7,552,292 | B2 | 6/2009 | Hsieh et al. |
| 7,574,629 | B2 | 8/2009 | Douady et al. |
| 7,590,815 | B1 | 9/2009 | De Waal |
| 7,598,726 | B1 | 10/2009 | Tabatabaei |
| 7,680,988 | B1 | 3/2010 | Nickolls et al. |
| 7,818,497 | B2 | 10/2010 | Gower et al. |
| 8,020,124 | B2 | 9/2011 | Sonics et al. |
| 8,032,329 | B2 | 10/2011 | Sonics et al. |
| 8,073,820 | B2 | 12/2011 | Sonics et al. |
| 8,108,648 | B2 | 1/2012 | Srinivasan et al. |
| 8,190,804 | B1 | 5/2012 | Sonics et al. |
| 8,229,723 | B2 | 7/2012 | Sonics et al. |
| 8,438,306 | B2 | 5/2013 | Sonics et al. |
| 8,484,397 | B1 | 7/2013 | Sonics et al. |
| 8,514,889 | B2 | 8/2013 | Sonics et al. |
| 8,601,288 | B2 | 12/2013 | Sonics et al. |
| 8,711,867 | B2 | 4/2014 | Sonics et al. |
| 8,798,038 | B2 | 8/2014 | Sonics et al. |
| 8,868,941 | B2 | 10/2014 | Sonics et al. |
| 8,972,995 | B2 | 3/2015 | Sonics et al. |
| 9,292,436 | B2 | 3/2016 | Sonics et al. |
| 9,405,700 | B2 | 8/2016 | Sonics et al. |
| 9,495,290 | B2 | 11/2016 | Sonics et al. |
| 9,910,454 | B2 | 3/2018 | Sonics et al. |
| 10,901,490 | B2 | 1/2021 | Ehmann et al. |
| 2002/0083256 | A1 | 6/2002 | Pannell |
| 2003/0088721 | A1 | 5/2003 | Sharma |
| 2003/0208553 | A1 | 11/2003 | Wingard et al. |
| 2004/0010652 | A1 | 1/2004 | Adams et al. |
| 2005/0076125 | A1 | 4/2005 | Weber et al. |
| 2005/0086412 | A1 | 4/2005 | Douady et al. |
| 2005/0096970 | A1 | 5/2005 | Weber |
| 2005/0117589 | A1 | 6/2005 | Douady et al. |
| 2005/0141505 | A1 | 6/2005 | Douady et al. |
| 2005/0157717 | A1 | 7/2005 | Douady et al. |
| 2005/0210325 | A1 | 9/2005 | Douady et al. |
| 2006/0047890 | A1 | 3/2006 | Van De Waerdt |
| 2007/0038791 | A1 | 2/2007 | Subramanian et al. |
| 2007/0110052 | A1 | 5/2007 | Kok et al. |
| 2007/0266350 | A1 | 11/2007 | Fulga et al. |
| 2007/0288778 | A1* | 12/2007 | Zhuang ................. G06F 1/3203 713/320 |
| 2008/0028090 | A1 | 1/2008 | Kok et al. |
| 2008/0235421 | A1 | 9/2008 | Jayaratnam et al. |
| 2008/0307240 | A1* | 12/2008 | Dahan ................... G06F 1/3203 713/320 |
| 2008/0320254 | A1 | 12/2008 | Wingard et al. |
| 2009/0042594 | A1 | 2/2009 | Yavuz et al. |
| 2010/0095137 | A1 | 4/2010 | Bieswanger et al. |
| 2011/0095803 | A1 | 4/2011 | Meijer et al. |
| 2012/0054511 | A1 | 3/2012 | Brinks et al. |
| 2013/0073878 | A1 | 3/2013 | Jayasimha et al. |
| 2013/0311796 | A1 | 11/2013 | Brinks et al. |
| 2014/0380071 | A1 | 12/2014 | Lee et al. |
| 2016/0070582 | A1* | 3/2016 | Clovis ................... G06F 1/3296 710/104 |
| 2016/0188501 | A1 | 6/2016 | Sonics et al. |
| 2016/0363985 | A1 | 12/2016 | Sonics et al. |
| 2018/0260017 | A1 | 9/2018 | Ehmann et al. |
| 2018/0260018 | A1 | 9/2018 | Ehmann et al. |

FOREIGN PATENT DOCUMENTS

| | | |
|---|---|---|
| WO | 2011127128 | 10/2011 |
| WO | 2018165111 | 9/2019 |

OTHER PUBLICATIONS

U.S. Appl. No. 15/912,934, “Non-Final Office Action”, dated Oct. 4, 2019, 8 pages.

U.S. Appl. No. 15/912,953, “Non-Final Office Action”, dated Oct. 4, 2019, 8 pages.

U.S. Appl. No. 15/912,934, “Notice of Allowance”, dated Apr. 15, 2020, 7 pages.

U.S. Appl. No. 15/912,953, “Notice of Allowance”, dated Apr. 13, 2020, 7 pages.

EP18764833.2, “Extended European Search Report”, dated Feb. 14, 2020, 10 pages.

PCT/US2018/021076, “International Preliminary Report on Patentability”, dated Sep. 19, 2019, 13 pages.

PCT/US2018/021076, “International Search Report and Written Opinion”, dated May 21, 2018, 13 pages.

Communiation Pursuant Article 94(3) for European Application No. 18764833.2, dated Nov. 26, 2021, 8 Pages.

* cited by examiner

200

440

SEQUENCER-BASED PROTOCOL ADAPTER

RELATED APPLICATIONS

This application claims priority under 35 USC 119 to U.S. provisional patent application Ser. No. 62/587,711, titled 'A sequencer-based protocol adapter,' filed Nov. 17, 2017, the disclosure of which is incorporated herein by reference in its entirety. This application also claims priority under 35 USC 121 as a continuation-in-part to patent application Ser. No. 15/912,934, titled 'An Operating Point Controller for power domains in an integrated circuit,' filed Mar. 6, 2018, which claimed priority under 35 USC 119 to U.S. provisional patent application Ser. No. 62/467,617, titled 'An Operating Point Controller for power domains in an integrated circuit,' filed Mar. 6, 2017, the disclosures of which are incorporated herein by reference in their entirety.

NOTICE OF COPYRIGHT

A portion of the disclosure of this patent document contains material that is subject to copyright protection. The copyright owner has no objection to the facsimile reproduction by anyone of the protocol adapter as it appears in the Patent and Trademark Office Patent file or records, but otherwise reserves all copyright rights whatsoever.

FIELD

In an embodiment, this concept generally applies to power management on an integrated circuit.

BACKGROUND

A System-on-a-Chip/integrated circuit design may have a need for lower power consumption in its multiple clock domains and multiple voltage domains. These domains enable power reduction by switching off local supplies to eliminate leakage current, dynamically scaling voltages and clock rates (especially in processing subsystems such as Central Processing Units (CPUs), Graphic Processing Units (GPUs), and video engines) to optimize active power for operating conditions and disabling or slowing IP core clocks to meet the needs of application usage scenarios. Nonetheless, the integrated-circuit system-power-manager turns different functional blocks on and off to achieve some of the above functions. For example, the communications network between different functional blocks may be left powered on or have merely portions powered down while these other functional blocks are put into a sleep mode or idle state. Room for improvement in this field exists.

SUMMARY

The following presents a simplified summary of the specification to provide a basic understanding of some aspects of the specification. This summary is not an extensive overview of the specification. It is intended to neither identify key or critical elements of the specification nor delineate any scope particular to any embodiments of the specification, or any scope of the claims. Its sole purpose is to present some concepts of the specification in a simplified form as a prelude to the more detailed description that is presented later.

In an embodiment, a method, an apparatus, and a system are discussed for a sequencer-based protocol adapter in an integrated circuit. A sequencer-based protocol adapter executes a limited instruction set. The sequencer-based protocol adapter is implemented in electronic hardware and programmable registers in an integrated circuit and is configured to transition a set of 1) one or more voltage sources, 2) one or more frequency sources, or 3) a combination of voltage sources and frequency sources, coupled with that sequencer-based protocol adapter. The sequencer-based protocol adapter manages power on the integrated circuit when a desired performance index is received at an input and then executes one or more of the limited instructions stored in the programmable registers in a proper sequence of steps in order to transition the coupled voltage sources and/or frequency sources from a current operational state to a desired operational state. The desired operational state of the coupled voltage sources and/or frequency sources corresponds to the received desired performance index. Note, the 1) voltage sources, 2) frequency sources, or 3) a combination of voltage sources and frequency sources can be transitioned into at least three different possible operational states.

BRIEF DESCRIPTION OF THE DRAWINGS

The multiple figures refer to the example embodiments of the design.

Figure 1:
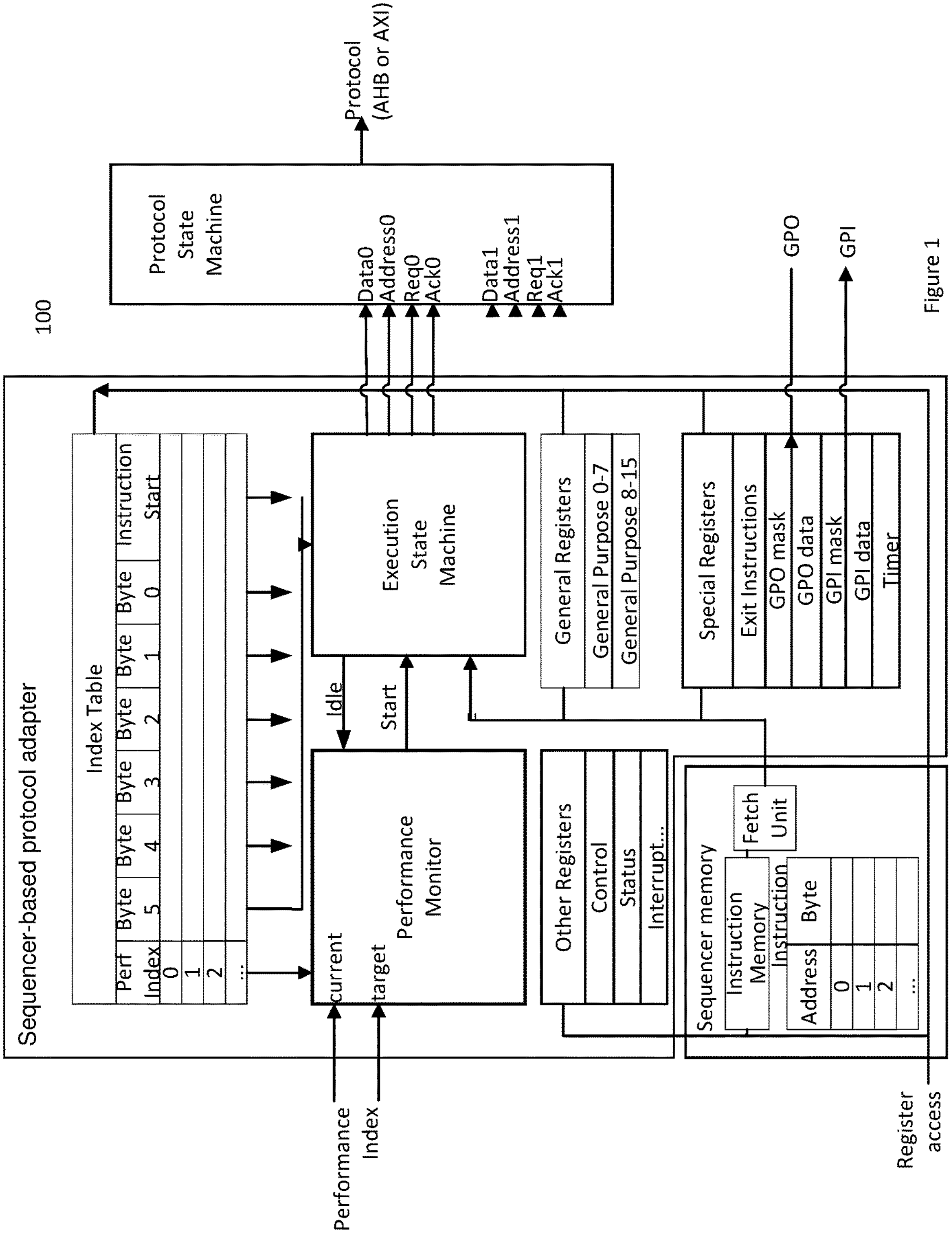
FIG. 1 illustrates a block diagram of an embodiment of a sequencer-based protocol adapter.

While the design is subject to various modifications and alternative forms, specific embodiments thereof have been shown by way of example in the drawings and will herein be described in detail. The design should be understood to not be limited to the particular forms disclosed, but on the contrary, the intention is to cover all modifications, equivalents, and alternatives falling within the spirit and scope of the design.

DETAILED DISCUSSION

In the following description, numerous specific details are set forth, such as examples of specific voltage levels, named components, connections, number of input connections, etc., in order to provide a thorough understanding of the present design. It will be apparent; however, to one skilled in the art that the present design may be practiced without these specific details. In other instances, well known components or methods have not been described in detail but rather in a block diagram in order to avoid unnecessarily obscuring the present design. Further specific numeric references (e.g., a first input, a second input, etc.) may be made. However, the specific numeric reference should not be interpreted as a literal sequential order but rather interpreted that the first input is different from a second input. Thus, the specific details set forth are merely exemplary. The specific details discussed in one embodiment may be reasonably implemented in another embodiment. The specific details may be varied from and still be contemplated to be within the spirit and scope of the present design. The term coupled is defined as meaning connected either directly to the component or indirectly to the component through another component.

In general, a method and system are discussed for a sequencer-based protocol adapter in an integrated circuit. One or more sequencer-based protocol adapter may be used in managing power on an integrated circuit, such as System on a Chip or MCU, in order to coordinate the transition of a collection of power, clock, voltage, and/or frequency domain states on the System on a Chip. The sequencer-based protocol adapter provides the translation between a performance index and the actual mechanism to make the change to the frequency and/or voltage resource. The following drawings and text describe various example implementations of the design.

FIG. 1 illustrates a block diagram of an embodiment of a sequencer-based protocol adapter (PASEQ). The sequencer-based protocol adapter 100 can at least include an index table, a performance monitor, an execution state machine, a set of registers including a plurality of general registers that store any dynamic or constant values used in the sequence of instructions, and a plurality of special registers that can implement special functions, a sequencer memory, a protocol state machine interface, and other components.

The sequencer-based protocol adapter 100 executes a limited instruction set. The sequencer-based protocol adapter 100 is implemented in electronic hardware and programmable registers in an integrated circuit in order to transition a set of 1) one or more voltage sources, 2) one or more frequency sources, or 3) a combination of voltage sources and frequency sources, coupled with that sequencer-based protocol adapter. The sequencer-based protocol adapter 100 is configured to manage power on the integrated circuit via receiving a desired performance index. The sequencer-based protocol adapter 100 receives the desired performance index at an input and then executes one or more of the limited instructions stored in the programmable registers in a proper sequence of steps in order to transition the coupled voltage sources and/or frequency sources from a current operational state to a desired operational state. Note, the desired operational state corresponds to the received desired performance index.

The sequencer-based protocol adapter 100 is configured to provide the translation between the desired performance index and a sequence of steps needed to transition the voltage sources and/or frequency sources to safely make a change in frequency and/or voltage level for the desired operational state without damaging or accidentally temporarily corrupting components on the integrated circuit supplied by those voltage sources and/or frequency sources. For example, the electronic components fed the clock signal and/or voltage level from the voltage sources and/or frequency sources must be given the proper time, clock signal, and voltage level to process any operation it may have started before that component is transitioned to a different operational state.

The sequencer-based protocol adapter 100 has a performance monitor to receive the desired performance index representing a desired operational state. The performance monitor is configured to check for a change between the current performance index and the desired performance index. After a change in performance index is detected and prior transitions to operational states have completed, then the sequencer-based protocol adapter 100 is configured to load instructions from the programmable registers, based on the desired operational state, that direct the sequencer-based protocol adapter 100 to sequence various internal operations to any of i) compose and generate transactions on a communication bus on the integrated circuit, and ii) take other actions to directly communicate to the frequency and/or voltage control source, and then in both cases wait for any of 1) handshake responses back from the source, 2) a fixed timer interval to expire, or 3) other events.

The sequencer-based protocol adapter 100 also has an index table configured to contain all three of 1) a list of possible performance indexes for the integrated circuit, 2) a starting address in the programmable registers for the limited instructions in the proper sequence to implement each of the possible operational states, as well as 3) local data values needed to be used in the sequence of instructions to achieve each specific operational state in the different possible operational states for the coupled voltage source and/or frequency source.

Thus, the index table is configured to contain the starting address for the instruction sequence used to implement the desired performance index and the local data values to be used in that instruction sequence to attain the desired performance index. The starting address for the instruction sequence is stored in a cell of the index table and each different local data value is stored in its own cell. When the required operations to change an operational state of the coupled voltage or frequency source is similar between performance indexes, then different levels of performance indexes contained in the index table can use a same starting instruction address for the instruction sequence used to implement the desired performance index, but with different local data values, in order to create different results for achieving each of the different possible levels of the performance indexes, which reduces instruction code storage requirements in the registers as well as storage requirements in the index table.

The sequencer-based protocol adapter 100 has a state machine that is configured to execute the limited instructions in the programmable registers to bring the coupled voltage and/or frequency source to a common operational state before sequencing to achieve the desired operational state corresponding to the desired performance index, which reduces both instruction code storage requirements and a switching delay between similar performance index states. For example, an exit instruction generally directs the source to a common operational state.

The sequencer-based protocol adapter 100 also has an index table and execution state machine. The sequencer-based protocol adapter 100 is configured to supply i) the source values for the desired operational state, (such as a new frequency or voltage level), for a coupled voltage or frequency source from the index table as well as ii) an order of sequenced steps needed to take in order to safely transition the frequency and/or voltage source into a new operational state from the programmable registers and the execution state machine.

The sequencer-based protocol adapter 100 has one or more outputs (e.g. GPOs) to electrically connect to control inputs of the set of frequency and/or voltage sources.

The sequencer-based protocol adapter 100 is configured to drive its outputs, which connect to the control inputs of the set of frequency and/or voltage sources coupled to that sequencer-based protocol adapter 100 when directing the proper sequence of instructions/steps to transition to the desired operational state.

The sequencer-based protocol adapter 100 also has one or more inputs (e.g. GPI) to monitor for any of i) an effect, ii) a response, or iii) a value, back from those frequency and/or voltage sources.

The sequencer-based protocol adapter 100 can cooperate with an external protocol state machine or integrate the protocol state machine. The sequencer-based protocol adapter 100 1) has one or more outputs (e.g. GPOs) to electrically connect to the protocol state machine to send one or more transactions that pass a control message to control inputs of the (likely off-chip) frequency and/or voltage sources. The protocol state machine is configured to 1) receive information consisting of at least i) a type of command/request with data associated with the desired operational state and ii) address locations of the frequency and/or voltage sources from the one or more outputs, and then 2) properly format the type of command/request, data, and the address locations of the frequency and/or voltage sources into a protocol format required to access the frequency and/or voltage sources in order to pass the control message in the proper protocol format to the control inputs of the (likely off-chip) frequency and/or voltage sources.

General Points

The performance monitor keeps track of the current operational state of the frequency and/or voltage control source to compare the current to the requested state for the frequency and/or voltage control source. Typically, the main power domain controller will determine the overall operational state for the chip, and then an operational point controller will figure out the specific state at that time for the frequency and/or voltage control source. The sequencer-based protocol adapter 100 will supply the source values for the new operational state, such as a new frequency or voltage level, as well as the steps to take to place the frequency and/or voltage control source into that new state.

The sequencer-based protocol adapter 100 is a very small and power efficient controller that is highly specialized to flexibly support a wide range of approaches for controlling frequency and/or voltage control sources, both on-chip and off-chip. The sequencer-based protocol adapter 100 provides the translation between a performance index and the actual source to make the change in the frequency/clock rate and/or voltage level (See for example FIGS. 2A and 2B).

Each sequencer-based protocol adapter 100 provides for a very power efficient implementation of an instruction sequencer which can transition a state of a corresponding voltage or frequency source (i.e. voltage regulator, clock controller, . . . ) from one state to another state in response to a new requested performance input received from a chip power management controller, such as a power domain controller via an operating point controller. The sequencer-based protocol adapter 100 can minimize the amount of instruction code storage using techniques such as directly providing variable data values for each input performance index in a manner easily accessible via a control processor. Furthermore, by providing the ability to execute exit instructions when leaving a performance index, the sequencer may bring the controlled source back to a common state before sequencing to achieve the new performance index, which may reduce both instruction code storage requirements and the switching delay between similar performance index states.

Note, in an embodiment, the performance index may convey: a Voltage Frequency Temperature index (output of operating point table); a VFT table output voltage and frequency indices (source performance index); or a protocol adapter input (protocol performance index.). The possible performance indexes for the integrated circuit correspond to a plurality of operational states/performance levels for the set of one or more 1) voltage sources, 2) frequency sources, or 3) a combination of voltage sources and frequency sources. The performance index can translate to a voltage and frequency operating point pair, which is sometimes called a p-state. The power state names assigned to power domains may be user defined, such as active, standby, retention, shutdown, boot up, etc.

The on-chip power management system may include a set of sequencer-based protocol adapters. Each sequencer-based protocol adapter 100 may be coupled to its own corresponding voltage or frequency control component on or off the chip. Each sequencer-based protocol adapter 100 is coupled to its own corresponding voltage or frequency control component in order to supply an operational state and series of operations to direct the corresponding voltage or frequency control component to a desired operational state.

More Detail on Various Components in and Associated With the Sequencer-Based Protocol Adapter

Performance Monitor

The performance monitor watches for changes on the incoming performance index. When a new performance index arrives and the sequencer is idle, the performance monitor accesses the index table to provide the starting instruction address for the new sequence to the execution state machine.

The performance monitor tracks the incoming performance index for changes. The performance monitor is configured to keep track of the current operational state of the frequency and/or voltage source versus the requested state for the frequency and/or voltage source. When a valid change is detected and the RUN bit is high and the execution state machine is IDLE, the monitor will set the busy signal in the performance index interface, perform a look up of the new performance index value in the index table and will return the start instruction location along with a start request to the execution state machine. The execution state machine then begins to process the state change. When the execution state machine has completed the sequence, the current performance index is updated and the busy signal dropped.

Execution State Machine

The execution state machine connects to the performance monitor, the index memory, a shared protocol state machine, a shared sequencer memory, and a set of general and special purpose registers. The execution state machine receives its input from the performance monitor, which received its input from power domain controller via a shared source arbiter or an operating point controller. The execution state machine requests an instruction from the sequencer memory and then decodes and executes the instruction. The execution state machine will go through it's different states (see FIG. 4 Sequencer flow) to either i) go through the exit instructions to get to a known stable state prior to executing the instructions to get the source to get to specific state or ii) go and directly start executing from the index table that the shared source arbiter is saying to go to, fetch instructions from the sequencer memory and return those instructions to the execution state machine. Note, in an embodiment, execution state machine will perform step ii above and only optionally perform step i) first. If the instruction is invalid the state machine will stop execution, issue an interrupt and clear the RUN bit. Otherwise, the execution state machine will continue until it reaches an instruction marked as the last instruction in the sequence.

The execution state machine fetches instructions from the sequencer memory and executes them until reaching the end of the sequence. These instructions may access index values from the selected index table row, the general registers and special purpose registers, generating store commands to the protocol state machine and/or performing general purpose input output (GPIO) operations. The execution state machine facilitates the instructions to have several different ways to load information into registers, as well as multiple ways to create addresses to target stores. The execution state machine facilitates the ability to access index values, both in creating register values and creating store addresses. The sequencer-based protocol adapter 100 uses the values in the index table to load the initial values the state machine needs and guides the state machine to then veer off to the additional instructions in the sequencer memory and general and special registers. In an embodiment, the initial value is the instruction address and then the other index table entries are available to the running instructions.

In an embodiment, the execution state machine executes the instructions that it loads. Those instructions may do a variety of things. For example: some instructions help build up values; other instructions move values to normal or special registers; still other instructions generate requests to the protocol state machine (write today; read in the future). Some instructions move information to special registers that have side effects. Some of those side effects include changing GPOs and waiting for GPI values, which means that the protocol state machine may be optional in some implementations.

Index Table

The index table holds the starting address for the instruction sequence used to implement the desired performance index, and optional index immediate values to use in that instruction sequence. When the required operations to change source values is similar between indices, multiple rows may use the same instruction address, with different values in one or more index immediate bytes to differentiate the results. The number of index immediate bytes, the width of the instruction address and the number of index rows are configurable, along with whether each field is read-write (registers) or read-only (hardwired).

The input program selection from the index table is based on a performance index for a voltage or frequency control component. Again, multiple index entries may use the same instruction address. Each program can have access to data, which is specific to that performance index, via the index table, which reduces program size and therefore area. The cells in the index table store user-provided values and these may be configured as read-only in order to save even more area and power.

The sequencer-based protocol adapter 100 may be configurable during design time and may optionally be re-programmed during manufacturing, testing, or run-time rather than implementing a fixed state machine. The content stored in the index table can be set during design time and/or when the chip is being manufactured. The content (e.g. instructions, addresses, values, constants, etc.) stored in the sequencer memory and general and special registers is programmable and sometimes over writable during run time. Thus, content may be configured during design time and may optionally be re-programmed or simply overwritten during run-time.

In an embodiment, the sequencer-based protocol adapter 100 supports up to 256 source performance index values. Each performance index is associated with a cell of a register that stores a starting instruction address and optional immediate data values for the instructions. Multiple performance index entries may point to the same starting address for the instruction sequence.

The size of the index table is configurable based on the maximum value allowed on the index input. The index table size can include a Depth containing a number of valid performance indexes 3-256, 1 to 8 bits; and a width containing a number of per-index data bytes (0-6) available for use by instructions servicing transitions to this index, plus enough bits to store maximum configured instruction address.

The index table contains the mapping of the performance index to the location of the first instruction for the execution state machine. In addition, an optional number of bytes of information (up to 6) can be addressed by the instructions executed by the execution state machine stored in this index memory. The value of these bytes will be dependent on the target performance index. This feature can allow a common series of instructions to be used across many different performance indexes, helping in reducing the instruction memory size, while allowing per-index differences in address, data or signal values generated by the instruction sequence.

Sequencer Memory

The byte-addressed sequencer memory holds the instructions. Portions of the sequencer memory may be configured as read-only, to save chip area and/or enable the use of the protocol sequencer during the initial booting process of the chip, before any processors or other state machines could program the sequencer memory. Other portions may be configured as read-write, providing flexibility to program the sequencer memory based upon, for instance, voltage sources that exist off-chip and have unique control requirements not known at design time. Any portions of the sequencer memory that are implemented as read-write registers (rather than read-only or compiled SRAM-type memories) can also be pre-loaded with initial instruction settings during the hardware reset operation associated with booting the chip.

The sequencer instruction memory contains the sequences of instructions that must occur when a change in the performance index occurs to successfully change the state of the controlled source. In the case of a voltage source, this would be the transition to a new voltage level for example. When implemented as flip flops the memory may be read-write or read-only on a byte basis to allow for minimal area and power. On the other hand, the memory may be implemented as a compiled memory. In either case, the memory is accessible via the register interface to the host processor.

The sequencer instruction memory is a set of registers that provides the instructions for each performance index. The same instructions may be used for multiple performance indexes. Since the instructions are a variable number of bytes and they are packed in this memory, the starting instruction byte may exist in any of the 8 bytes. The modifier of "Last" in Opcode is used to indicate that this is the last instruction in a sequence, so the sequencer will end processing the performance index change after this instruction.

General Purpose Registers (GPRs)

The general purpose registers hold transaction address, data, etc. in its fields. A preloaded instruction can be used or a pre-operational configuring index table can be set so that the adapter can be used as part of boot sequence to initially turn on voltage and frequency sources. For example, an initial value may be set for each register that will be pre-loaded during the hardware reset operation associated with booting the chip.

The amount of general purpose registers instantiated is configurable at compile time and the implemented registers will be allocated starting at offset 0. The general purpose registers are 32 b wide. Up to 16 may be configured, and each may be configured as read-write or read-only. Read-only registers are useful as a way to include constants.

Special Purpose Registers

The special purpose registers (SPR) hold instructions with side-effects. The Special Purpose Registers support at least one programmable timer, masked GPIO operations and an exit instruction address. The special purpose registers (SPR) hold instructions with side-effects such as wait on timer, program counter, exit instruction register, set/clear general purpose output pattern (masked GPO), wait on general purpose input pattern (masked GPI), exit address points to address sequence used to restore source to known state before sequencing next performance index change, etc. All are accessed as destinations of special move instructions. Updating the general purpose input pattern (masked GPI) or general purpose output pattern (masked GPO) register specifies which GPIO bits will be accessed by the next GPIO data register operation. Moves to the GPO data register use the mask value to determine which GPO bits to update. Moves to the GPI data register wait for the non-masked inputs to match the provide value. Moves to the timer register wait for the timer to count the provided cycle count. Moves to the exit instruction address instruct the execution state machine to execute that sequence of instructions the next time that the target performance index input changes, enabling the sequencer to bring the source back to a common state. This is especially useful when exiting a performance index that resulted in powering off the source; by ensuring the source gets sequenced back to an operating level before loading the new performance index, other sequences do not need to needlessly assume that the source might not be operational. The exit instructions can be run before leaving a performance index, which reduces program size and delay.

Note, the sequencer-based protocol adapter 100 utilizes the above sequencer memory, general purpose registers, and special purpose registers. For example, the sequencer-based protocol adapter 100 makes the program selection based on the index input. During run time of the device, the sequencer-based protocol adapter 100 may access data in the index table based on the performance index, general registers, and special registers. The sequencer-based protocol adapter 100 may use exit instructions obtained from any of these locations.

General Purpose Outputs

The sequencer also supports up to 16 output signals. There are two registers for setting the GPOs. The first one is a mask register that enables which GPO bits are modifiable by the sequencer in the GPO data register. The second register is the GPO data register.

Each sequencer-based protocol adapter 100 can interact with general purpose inputs and outputs or via a protocol interface (e.g. AXI, AHB, . . . ). The sequencer-based protocol adapter 100 can perform the basic required functions such as storing data to the protocol interface (i.e. writes), driving the general purpose outputs, waiting for one or more general purpose inputs to match specific values, and waiting for a timer to expire, which are needed to control the various sources in a System on a Chip/Integrated Circuit.

General Purpose Inputs

The sequencer support up to four general purpose input signals. These signals are used to delay the execution of instruction until the input signals have reached a specific state. The comparison performed on the GPI signals is initiated when the DataGpi register is written.

Protocol State Machine

The protocol state machine may communicate the results of the instructions executed by the execution state machine directly to the corresponding frequency and/or voltage control source send the instructions as a write type command over a shared communication bus to the frequency and/or voltage control source.

The protocol state machine (PSM) varies based on the sequencer-based protocol adapter 100 configuration, and is responsible for translating store and/or GPIO actions from the sequencer-based protocol adapter 100 into the required protocol to access the source. The protocol state machine is also in charge of making sure the data is in the proper byte lanes for the transaction. The protocol state machine may translate and format into multiple protocols, for example, AXI, AHB or APB. For example, the PSM for AXI4-Lite might translate sequencer-based protocol adapter 100 Store commands into properly-formatted AXI4-Lite commands on the AW and W channels, and wait for the responses on the B channel.

The protocol state machine interface of the sequencer-based protocol adapter 100 can use multiple styles of associated source communication. For example, control via AMBA (AXI4-Lite or AHB) write transactions and/or general purpose input/output (GPIO) signaling.

Fetch Unit Interface

The sequencer memory also contains a fetch unit that will return a complete instruction to all sequencers with a valid signal to the specific requesting sequencer. The fetch unit will also detect illegal, out of range and overrun instructions and return these indicators to the sequencer. The fetch unit will need to restart a fetch if a configuration write happens simultaneously. Lastly, the fetch unit will return the start address for the next instruction; this is the current address incremented by the number of bytes fetched.

Note, the sequencer-based protocol adapter 100 has an autonomous behavior that does not require a microprocessor or other central processing unit for normal operation. The sequencer-based protocol adapter 100 does not need the additional hardware components of a micro-controller or micro-processor. The area occupied on the limited space on a chip for the sequencer-based protocol adapter 100 is much smaller than using a dedicated micro-controller. The sequencer-based protocol adapter 100 consumes lower power than waking up a microprocessor because it has many fewer logic gates and requires many fewer internal operations to accomplish its work. The sequencer-based protocol adapter 100 is quicker to respond to operational state changes than a micro-controller.

Figure 2A:
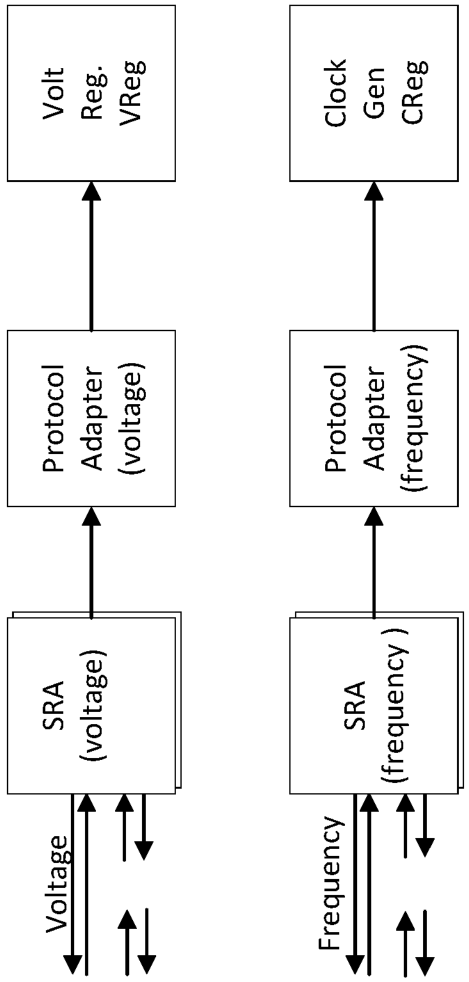
FIG. 2A illustrates a block diagram of an embodiment of two sequencer-based protocol adapters connected between a shared resource arbiter and their own voltage source or frequency source.

FIG. 2A illustrates a block diagram of an embodiment of two sequencer-based protocol adapters connected between a shared resource arbiter and their own voltage source or frequency source. In this example, two sequencer-based protocol adapters 200 (protocol adapters) on the chip connect between a shared resource arbiter (SRA) and their own voltage source (voltage regulator VReg) or frequency source (clock generation circuit CReg). In this example, each frequency or voltage source has its own sequencer-based protocol adapter 200 to control the operational state for that frequency and/or voltage source. Note, the 1) voltage sources, 2) frequency sources, or 3) a combination of voltage sources and frequency sources, generally have many operational states as discussed above but at least have three different possible operational states that can be transitioned into and out of: on, low power, clock shut off state, retention voltage level state, power shut off state, etc. The shared resource arbiter receives the performance index from an operating point controller for that power domain.

A given integrated circuit/chip might have, for example, three phase-lock-loop circuits and one or more frequency-divide circuits to control the different clock signals used by the chip. The set of sequencer-based protocol adapters on the chip can scale to handle many voltage control sources as well as frequency/clock control sources on the chip. Thus, the phase-lock-loop circuits and frequency-divide circuits may each connect to its own sequencer-based protocol adapter, or, for example, multiple frequency-divide circuits may connect to a single sequencer-based protocol adapter. Likewise, multiple voltage supply circuits may control the operational voltage level connected to the components each specific voltage supply rail on the chip. Each voltage regulator may connect to its own sequencer-based protocol adapter 200 or, for example, multiple voltage regulators may connect to a single sequencer-based protocol adapter.

Figure 2B:
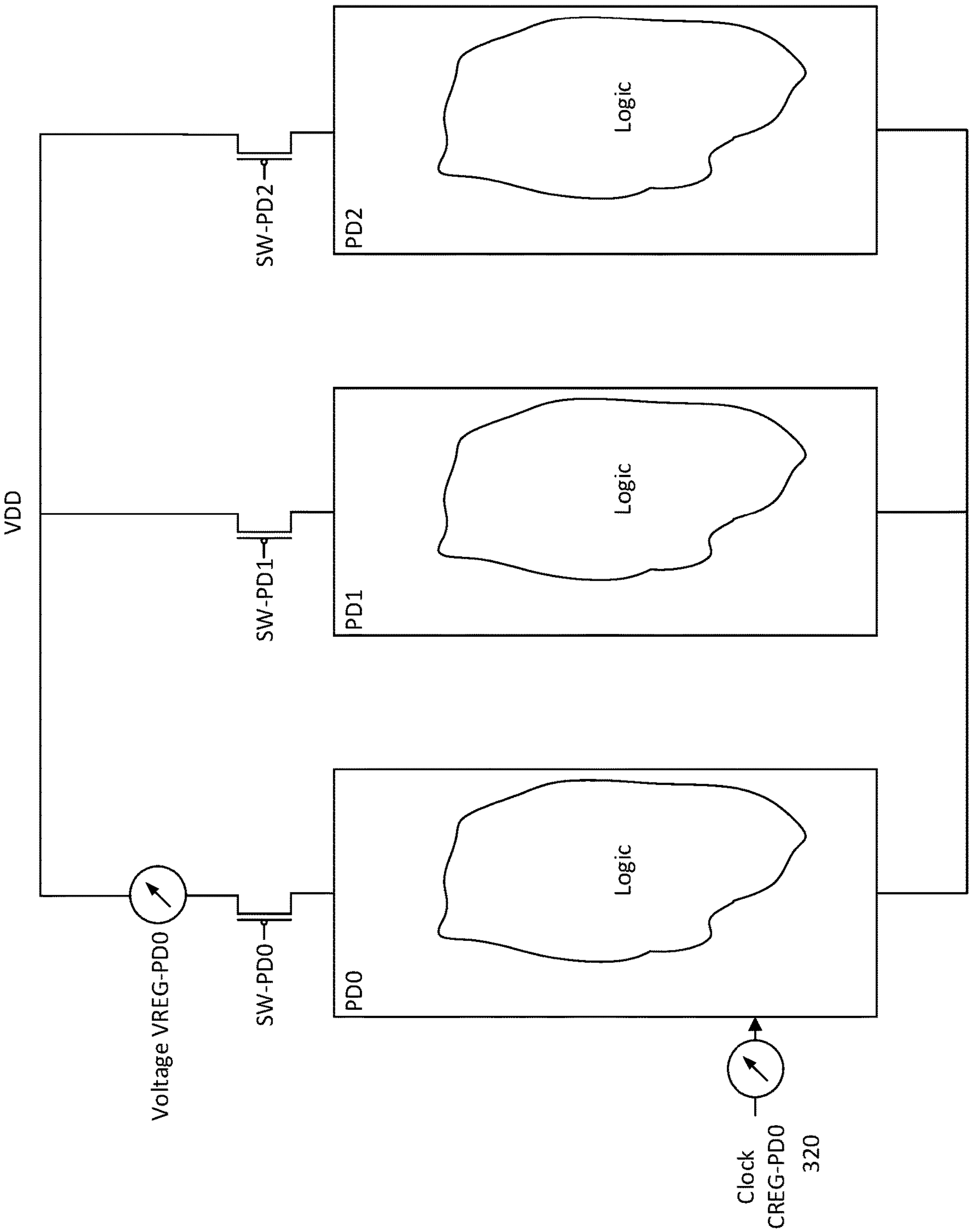
FIG. 2B illustrates three example power domains, one voltage source supplying and controlling the voltage level in the three power domains, and one frequency source controlling the clocking rate in each of the three power domains.

FIG. 2B illustrates three example power domains, one voltage source (VReg) supplying and controlling the voltage level in the three power domains PD0-PD1, and one frequency source (Clock CReg) 320 controlling the clocking rate in each of the three power domains. The two or more circuit regions include power domains that include digital logic, such as PD1, power domains that include analog circuits, such as PD2, and power domains that include any combination of both digital logic and analog circuits, such as PD0. In this example, an operating point controller can define a set of operating points that are received as a performance index by the sequencer-based protocol adapter for voltage and the sequencer-based protocol adapter for frequency. Each sequencer-based protocol adapter sequences a turning on and off for power switches for each power domain controller that connects to that particular voltage and/or frequency source 320. The sequencer-based protocol adapter is configured to order this sequence of power domain controllers turned on from a compile-time static list of member power domain controllers, which will determine when a given power domain controller is allowed to turn on its power switches relative to other power domain controllers.

Figure 3:
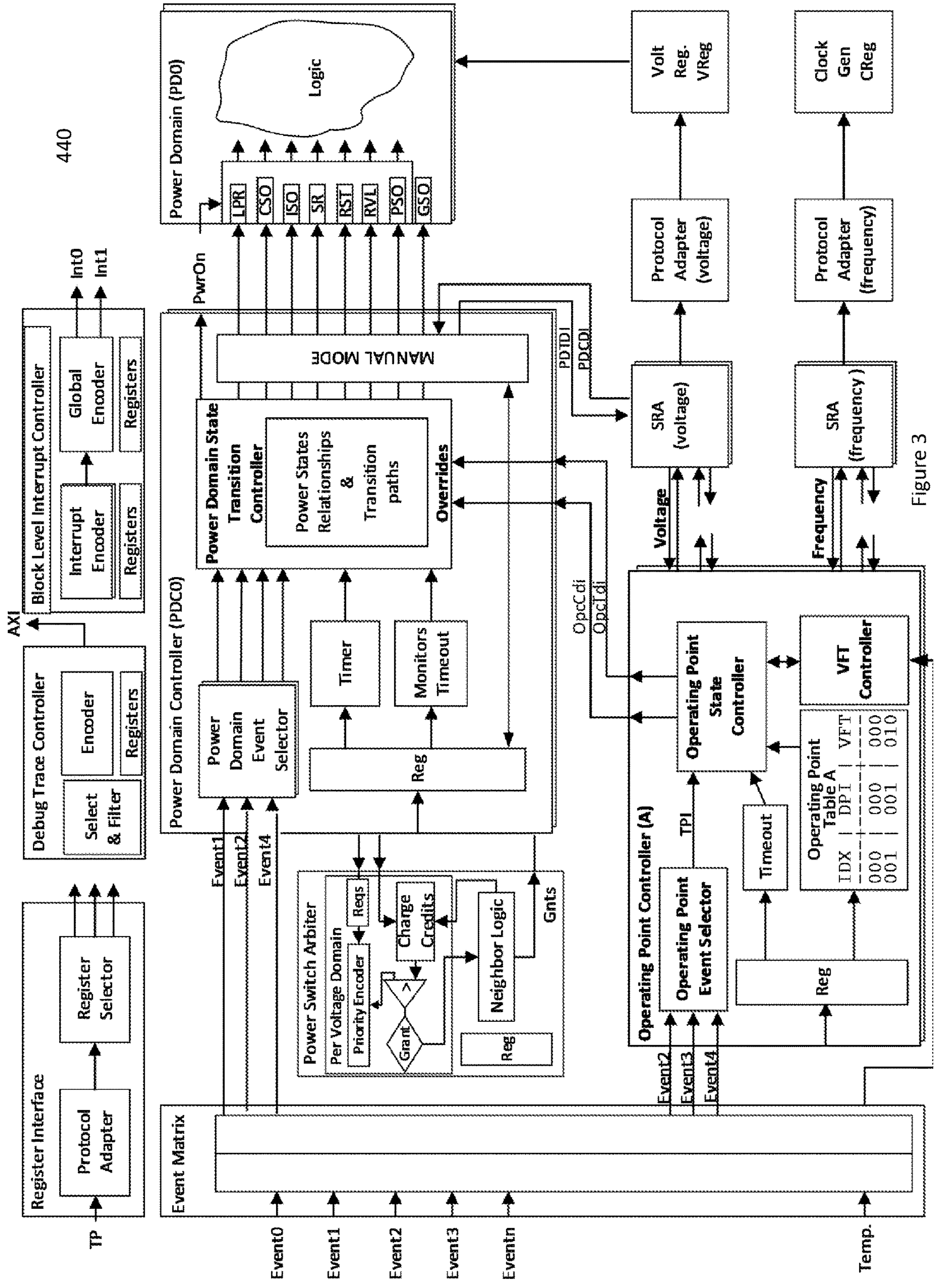
FIG. 3 illustrates a block diagram of an embodiment of a chip level power management controller electrically coupled to a plurality of sequencer-based protocol adapters, where each sequencer-based protocol adapter is coupled to a voltage resource or frequency resource.

FIG. 3 illustrates a block diagram of an embodiment of a chip level power management controller electrically coupled to a plurality of sequencer-based protocol adapters, where each sequencer-based protocol adapter is coupled to a voltage resource or frequency resource.

In an embodiment, the example the power management system 440 of the integrated circuit may have components such as the following.

A power domain controller block (PDC0) controls power in many smaller local domain blocks. The controller contains the brains of the power manager in one central location. The power management system is "intelligent" in that it can take decisions without external software support; and at the same time is preferably programmable, so its behavior can be changed at run-time to supports different chip operating modes. The power manager cooperating with sequencer-based protocol adapters provides easy to implement power policies tailored to each power domain. The power domain controller orchestrates the transition of the power domains through the various power states by sending or directing a performance index. The local domain blocks follow the instructions of the controller but are physically located some distance from the controller, closer to the managed power domains. The operating point controller may cooperate with a set of sequencer-based protocol adapters to manage power consumption in a proper sequence on the chip.

The chip level power management controller, such as an operating point controller, is electrically coupled to the plurality of sequencer-based protocol adapters. Each sequencer-based protocol adapter is coupled to its own corresponding voltage resource or frequency resource located on or off the integrated circuit. Each sequencer-based protocol adapter is coupled to its own corresponding voltage source or frequency source in order to supply the sequence of operations to direct the corresponding voltage or frequency resource to the desired operational state. The chip level power management controller is electrically coupled to the sequencer-based protocol adapter via the input in order to set the desired performance index, and then the sequencer-based protocol adapter is configured, upon receiving the desired performance index, to execute one or more of the limited instructions in the programmable registers in the proper sequence of steps in order to transition the coupled voltage resources and/or frequency resources into the desired operational state.

The register interface block provides the implementation of the protocol (e.g. AXI4-Lite, APB4, etc.) to read and write all the register in the various blocks.

The debug trace block provides real-time tracing information about the selected power manager functions in a manner compatible with and directly connectable to, for example, an ARM CoreSight® embedded trace system.

The event matrix collects incoming hardware events and distributes them to the power domain controller and/or operating point controller.

The instance level interrupt controller gathers the aggregated interrupts from each block and encodes and prioritizes them back to a host CPU or local microcontroller.

The power switch arbiter implements a set of rules that prevent simultaneous power up of domains that could endanger the safe operation of domains on the same voltage supply or located physically close to the transitioning domains.

The operating point controller coordinates the transitioning of a collection of power, clock, voltage and frequency domain states. This can be used to implement subsystem abstraction and advanced management techniques such as dynamic voltage and frequency scaling (DVFS).

The shared resource arbiters aggregate the requested settings for voltage and frequency to produce a legal result.

The sequencer-based protocol adapters provide the translation between a performance index and the actual mechanism making the change to the voltage level or frequency rate. The sequencer-based protocol adapter has an input to a performance monitor to receive the desired performance index from the chip level power management controller and pass that to an index table to set the performance index. The sequencer-based protocol adapter is configured to use i) a state machine and ii) instructions and data in the programmable registers in order to transition the current operational state of a coupled voltage or frequency resource (i.e. voltage regulator, clock controller, phase lock loop, etc . . . ) from the current operational state to the desired operational state in response to the desired performance index received from and set by the chip level power management controller.

Again, the sequencer version of the protocol adapter occupies a small area compared to a GPU, is super power efficient in it consumes less power and its coupled sources consume less power than other techniques, and does not need utilize processing cycles from the GPU of the integrated circuit or processing cycles from a power domain controller to carry out its instruction set on transitioning coupled voltage and/or frequency sources through different performance levels. The sequencer version of the protocol adapter will read instructions from its instruction memory and sequence the various operations desired to generate, for example, AMBA bus transactions, drive signals, wait for responses to perform a resource change in the system, etc. Besides the instructions, which directly impact the external interfaces, the sequencer also supports instructions to move or load data into internal registers to form address, data or output signal values.

Figure 4:
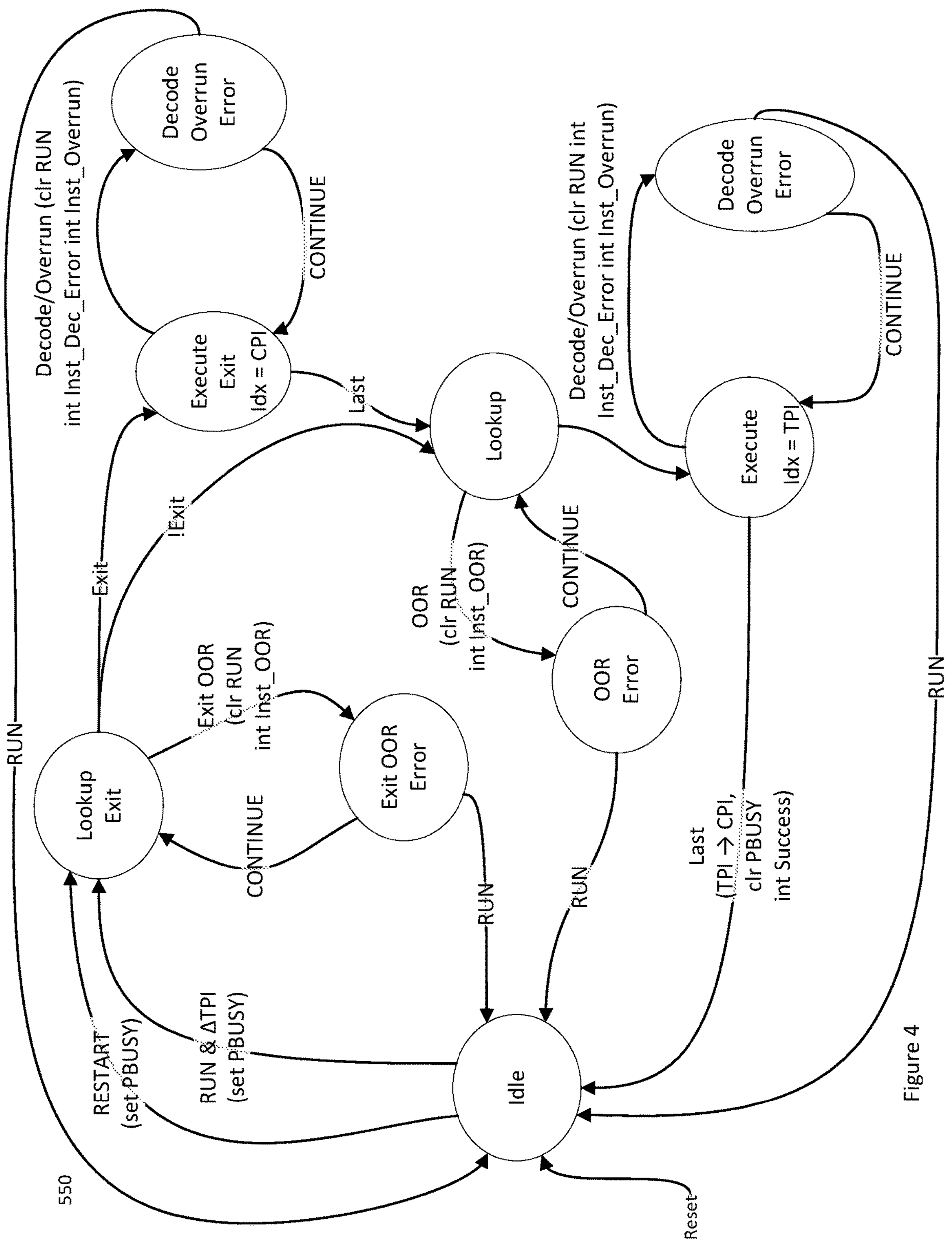
FIG. 4 illustrates a flow diagram of an embodiment of an execution state machine in the sequencer-based protocol adapter going through its different states.

FIG. 4 illustrates a flow diagram of an embodiment of an execution state machine in the sequencer-based protocol adapter going through its different states.

The sequencer-based protocol adapter has an execution state machine that is configured to receive its input from a performance monitor in the sequencer-based protocol adapter. The performance monitor is configured to receive the desired performance index from a chip power controller and pass on the desired performance index when it is different from a current performance index. The execution state machine is configured to go through it's different states to either:

i) go through a sequence of exit instructions to first get to a known common state prior to executing the other instructions to get the coupled voltage and/or frequency sources to a desired operational state, or ii) go and reference one or more cells in the index table to obtain a starting address in the programmable registers for the limited instructions in order to fetch and then execute them in the proper sequence to implement the proper steps to achieve the desired operational state for the coupled voltage and/or frequency source, or iii) a combination of both steps i) and ii) above.

The top level flow 550 for the sequencer-based protocol adapter is as follows. After reset, the sequencer-based protocol adapter will be in the idle state. If the RUN bit is high and a change in the target performance index is detected then the sequencer will start processing and set the PBUSY output. First looking if there is an exit instruction defined and if so executing these instructions using the index memory from the current performance index. Followed by a second look-up and execute phase for the target performance index using the index memory from the target performance index. When complete, the current performance index is updated and the reset the PBUSY output. The different errors described above may direct the flow to one of the error states. When entering an error state, the RUN bit will be reset. From these error states, the host may set the MANUAL.CONTINUE bit after the error to try and continue execution with updated instruction memory, exit instruction value or index table values. Alternatively, complete the resource transition in software, cleanup the performance index handshake via the MANUAL.SET_CPI and MANUAL.CLEAR_PBUSY fields, correct the instruction memory, exit instruction value or index table values and then set the MANUAL.RUN bit to be reset back to the Idle state for full operation. The RUN bit may be enabled or disabled in any state. Enabling the RUN bit has no effect unless in the Idle or Error states. Disabling the RUN bit has no effect until in the Idle state.

Instruction Examples

Below are some example instructions for the sequencer.

Exit Instructions

The special purpose register is loadable with an address for a new instruction sequence which will be executed when the sequencer leaves the current protocol performance index. Moving data into this register via the sequencer enables the one time exit instructions for the next performance index change. The index memory entry accessed during the exit instruction sequence shall be that associated with the current performance index and not the new target performance index.

Timer

The timer block provides for a fixed delay to be inserted in the instruction sequence. This delay can be used to allow for a resource to stabilize, e.g. when a GPI to provide a direct indication from the resource is not available. The timer consists of a 2 bit prescale value which indicates which global prescaler output to use. The values are single clock, 16 clocks, 256 clocks or 4096 clocks. A prescale value greater than a single clock may introduce some error into the timer based on the current value of the global prescaler when the timer starts. The timer value itself is configurable up to the 8 bit default value. When the timer expires, the execution state machine will continue.

Move to Register

The move to a register command will be as follows. destOperand is the destination general purpose register or special purpose register and the sourceOperand can be a general purpose register, index register or an immediate value.

[<label>:] Mv[<.size>][<.Last>] <destOperand> <sourceOperand>[;<comment>]

To indicate a specific byte of the destOperand we include a pair of square brackets with a number after the register name. An example would be r0[2]. This is legal when the size modifier is set to a byte, otherwise a simple register name is allowed. The register specification may utilize these general purpose registers: r0 to r15, or these special purpose registers: rTimer, rMaskGpo, rDataGpo, rMaskGpi, rDataGpi or rExitInst.

The sourceOperand also follows the same rule for the specification of a register byte as the destOperand. The register specification may utilize these general purpose registers: r0 to r15. The sourceOperand can also specify the start byte of the index register and it does so in a similar way with a square bracketed byte indicator. The sourceOperand may also be an immediate value.

This is an example which moves byte 3 of the index register to byte 1 of register 0.

Mv.B r0[1], rIdx[3]

Store to an Address

The store command is also written like the move command except that the first operand is enclosed inside square brackets. addrOperand is the address register for the store and the sourceOperand can be a general purpose register, index register or an immediate value.

[<label>:] St[<.size>][<.Last>]\[<addrOperand>\]<sourceOperand>[;<comment>]

For the addrOperand we may utilize r0 to r15 to contain the address.

The sourceOperand here follows the same rules as described for the register move command.

This is an example which stores 32 bits of r4 to the address in r0.

St.W [r0], r4

Store to an Address with an Immediate Offset

The store command can also take an immediate offset to the address. This command is similar to the store to an address command but it has an additional offset immediate value inside the square brackets.

[<label>:] St[<.size>][<.Last>]\[<addrOperand><+> <imm>\]<sourceOperand>[;<comment>]

This is an example which stores 32 bits of r4 to the address in r0 plus 8.

St.W [r0+0x8], r4

Wait Operation

The wait operation command is written as follows. This command will wait for the timer to expire of the GPI signal to match with the previously loaded or read-only value. One may use the move command to load new value and perform a wait if required.

[<label>:] Wait<.Last><rTimer,rDataGpi>[;<comment>]

This is an example which causes the sequencer to start the timer and stall on this command until the value in the rTimer register has expired.

Wait rTimer

No Operation

The no operation command is written as follows.

[<label>:] NoP<.Last>[;<comment>]

This is an example of a NoP.

NoP

GPO Only Functions/Instructions

The last three instructions are an example of what is needed for a GPO only functioning sequencer-based protocol adapter. The first instruction moves the index memory data to the DataGpo output, this assumes the MaskGpo value is predefined. Then, the timer is started with a predefined value stored in general purpose register 0. Lastly, the DataGpi is loaded to wait for the GPI bit 0 signal to go be high, assume Mask Gpi is predefined.

Reset

The reset value for the current performance index (CPI) is not required to match the reset value coming from the operating point controller, but the busy signal should be active out of reset. The operating point controller will be driving a non-valid target performance index (TPI) and all points between the operating point controller and sequencer-based protocol adapter will have a non-valid TPI value. When the first valid TPI value comes into the sequencer-based protocol adapter after reset this will be stored as the CPI, CBUSY de-asserted and no action by the sequencer-based protocol adapter will be taken until the TPI changes to a different valid value. The GPO value will be provided immediately during reset by the reset value of the SP_REG_DATAGPO register.

If sequence code needs to be run directly after reset then an additional operating point controller state should be defined with no event inputs. Therefore, the operating point controller will immediately after reset transition to another state and cause a TPI change between two valid indexes.

State Dependent Execution

State dependent execution based on the target performance index is enabled by using independent starting instructions and/or unique data in the index memory for the TPI. Since the sequence of instructions is chosen only based on the target performance index, the sequence must be valid independent of the previous performance index. To provide for state dependent execution based on the previous index, a series of instruction can be registered to be executed when leaving a performance index using the exit instruction special purpose register. These instructions may, for example, perform a startup task after a resource has been powered off.

Error Conditions

Instruction decode—if the first byte of an instruction is not valid, an INST_DEC_ERROR interrupt will be raised and the sequencer RUN bit reset.

Instruction decode—a move to a destination register that is not implemented or read-only will raise an INST_DEC_ERROR interrupt and the sequencer RUN bit reset.

Store commands that are wider than the interface an INST_DEC_ERROR interrupt will be raised and the sequencer RUN bit reset.

Store commands that do non-full bus writes when the interface does not support byte writes an INST_DEC_ERROR interrupt will be raised and the sequencer RUN bit reset.

Not enough bytes for an instruction—if while fetching the instruction the end of the memory is reached an INST_OVERRUN interrupt will be raised and the sequencer RUN bit reset.

Instruction sequence out of range—if the instruction sequence starts outside the range of the memory an INST_OUT_OF_RANGE interrupt will be raised and the sequencer RUN bit reset.

Exit instruction sequence out of range—if the exit instruction sequence starts outside the range of the memory an INST_OUT_OF_RANGE interrupt will be raised and the sequencer RUN bit reset.

Protocol port errors—instructions that generate commands on the protocol port do not support the returning of an error condition. Therefore, these commands cannot vary their behavior based on a bus error. The execution of the sequence of instructions will continue.

TPPI—an interrupt is generated when the arbitrated target protocol performance index output of the PA changes.

CPPI—an interrupt is generated when the incoming current protocol performance index from the downstream PA changes.

Some additional instruction supported may include load, compare, branch, and minimal arithmetic and logic operations.

The sequencer-based protocol adapters being implemented in hardware logic allows for faster transitions of state to occur in power domains than by, for example, a software running on a CPU controller. Faster transitions of state occurring in voltage and/or frequency domains translate to a greater savings in average power dissipation and thus an increase in battery life. The increase in battery life mainly comes from enabling the these transitions between a higher power mode and a lower power mode, and vice-versa, to occur more frequently, because it only makes sense to transition to a lower power mode if the circuit will spend enough time in that new mode to save more energy than the control system spent in transitioning. Note, the CPU-based power manager needs to detect the opportunity to save power (or the need to increase performance), save its current state, load and process the control software instructions and then issue commands to the controlled resources, which is slower than hardware logic sensing the appropriate conditions and directly sequencing the desired outputs.

Figure 5:
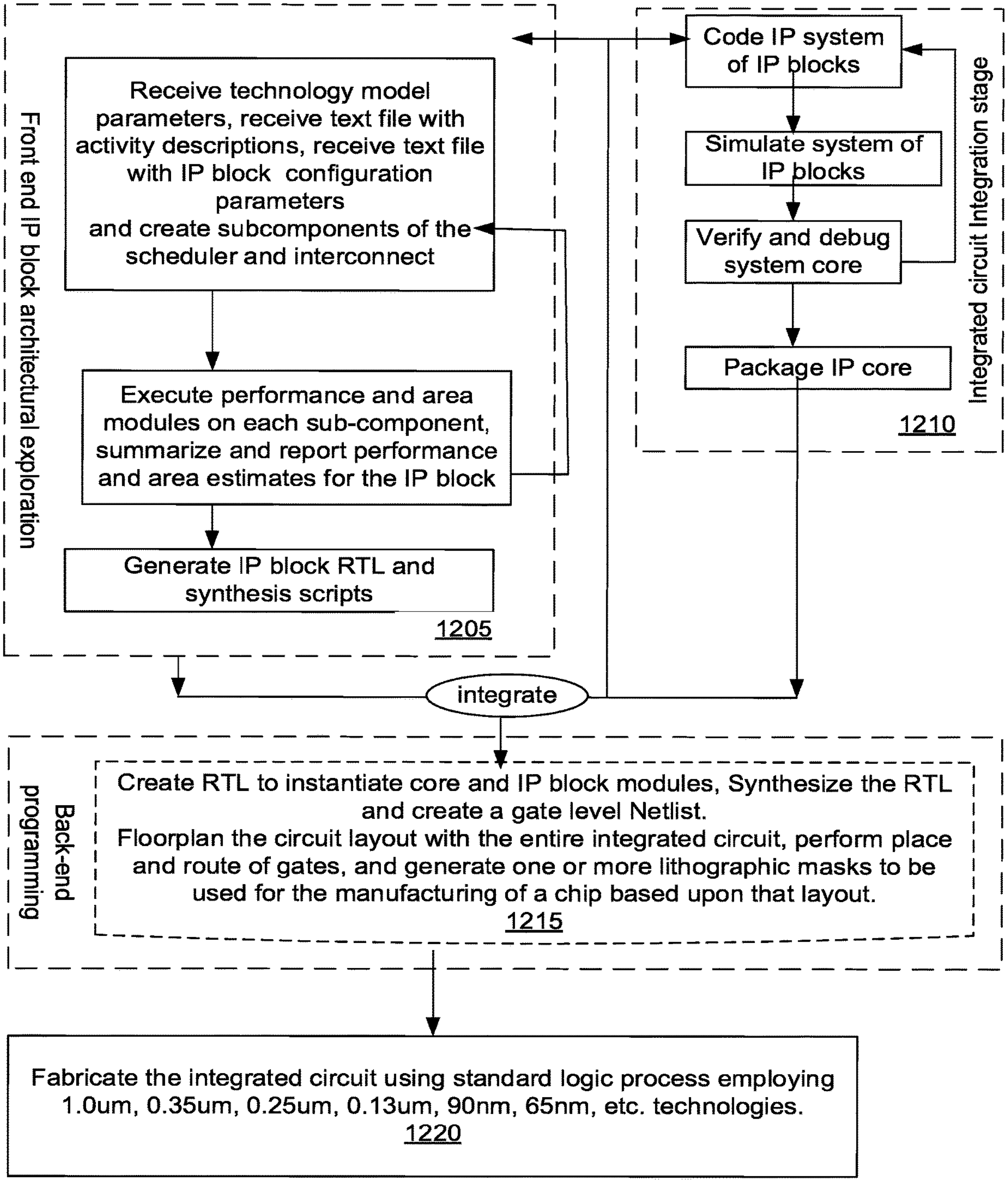
FIG. 5 illustrates a flow diagram of an embodiment of an example of a process for generating a device, such as an integrated circuit, with one or more sequencer-based protocol adapters, in accordance with the systems and methods described herein.

FIG. 5 illustrates a flow diagram of an embodiment of an example of a process for generating a device, such as an integrated circuit, with one or more sequencer-based protocol adapters, in accordance with the systems and methods described herein. The example process for generating a device with designs of the Interconnect and/or power management components may utilize an electronic circuit design generator, such as a System on a Chip compiler, to form part of an Electronic Design Automation (EDA) toolset. Hardware logic, coded software, and a combination of both may be used to implement the following design process steps using an embodiment of the EDA toolset. The EDA toolset such may be a single tool or a compilation of two or more discrete tools. The information representing the apparatuses and/or methods for the circuitry discussed herein may be contained in an Instance such as in a cell library, soft instructions in an electronic circuit design generator, or similar machine-readable storage medium storing this information. The information representing the apparatuses and/or methods stored on the machine-readable storage medium may be used in the process of creating the apparatuses, or model representations of the apparatuses such as simulations and lithographic masks, and/or methods described herein.

Additionally, an Electronic Design Automation Development tool for the operating point controller produces key deliverables like IEEE-1801 UPF output files that streamline the integration of the IP into the customer design while ensuring both control protocol and electrical consistency and correctness throughout the implementation flow. Finally, the operating point controller offers rich support for in-system software to monitor activity, tune power management priorities, and even override the hardware machines whenever desired.

Generation of the RTL and UPF views of the configured Power Management subsystem, together with a UVM-based verification test bench and automatic, configuration-dependent stimulus definition of linked subsystems composed of multiple domain controllers, with hardware coordination of coupled state transitions based on shared events.

Aspects of the above design may be part of a software library containing a set of designs for components making up the scheduler and Interconnect and associated parts. The library cells are developed in accordance with industry standards. The library of files containing design elements may be a stand-alone program by itself as well as part of the EDA toolset.

The EDA toolset may be used for making a highly configurable, scalable System-On-a-Chip (SOC) inter block communication system that integrally manages input and output data, control, debug and test flows, as well as other functions. In an embodiment, an example EDA toolset may comprise the following: a graphic user interface; a common set of processing elements; and a library of files containing design elements such as circuits, control logic, and cell arrays that define the EDA tool set. The EDA toolset may be one or more software programs comprised of multiple algorithms and designs for the purpose of generating a circuit design, testing the design, and/or placing the layout of the design in a space available on a target chip. The EDA toolset may include object code in a set of executable software programs. The set of application-specific algorithms and interfaces of the EDA toolset may be used by system integrated circuit (IC) integrators to rapidly create an individual IP core or an entire System of IP cores for a specific application. The EDA toolset provides timing diagrams, power and area aspects of each component and simulates with models coded to represent the components in order to run actual operation and configuration simulations. The EDA toolset may generate a Netlist and a layout targeted to fit in the space available on a target chip. The EDA toolset may also store the data representing the interconnect, power management components, and other logic circuitry on a machine-readable storage medium. The machine-readable medium may have data and instructions stored thereon, which, when executed by a machine, cause the machine to generate a representation of the physical components described above. This machine-readable medium stores an Electronic Design Automation (EDA) toolset used in a System-on-a-Chip design process, and the tools have the data and instructions to generate the representation of these components to instantiate, verify, simulate, and do other functions for this design.

Generally, the EDA toolset is used in two major stages of SOC design: front-end processing and back-end programming. The EDA toolset can include one or more of a RTL generator, logic synthesis scripts, a full verification testbench, and SystemC models.

Front-end processing includes the design and architecture stages, which includes design of the SOC schematic. The front-end processing may include connecting models, configuration of the design, simulating, testing, and tuning of the design during the architectural exploration. The design is typically simulated and tested. Front-end processing traditionally includes simulation of the circuits within the SOC and verification that they should work correctly. The tested and verified components then may be stored as part of a stand-alone library or part of the IP blocks on a chip. The front-end views support documentation, simulation, debugging, and testing.

In block 1205, the EDA tool set may receive a user-supplied text file having data describing configuration parameters and a design for at least part of a tag logic configured to concurrently perform per-thread and per-tag memory access scheduling within a thread and across multiple threads. The data may include one or more configuration parameters for that IP block. The IP block description may be an overall functionality of that IP block such as an Interconnect, memory scheduler, etc. The configuration parameters for the interconnect IP block and/or power management components may include parameters as described previously.

The EDA tool set receives user-supplied implementation technology parameters such as the manufacturing process to implement component level fabrication of that IP block, an estimation of the size occupied by a cell in that technology, an operating voltage of the component level logic implemented in that technology, an average gate delay for standard cells in that technology, etc. The technology parameters describe an abstraction of the intended implementation technology. The user-supplied technology parameters may be a textual description or merely a value submitted in response to a known range of possibilities.

The EDA tool set may partition the IP block design by creating an abstract executable representation for each IP sub component making up the IP block design. The abstract executable representation models TAP characteristics for each IP sub component and mimics characteristics similar to those of the actual IP block design. A model may focus on one or more behavioral characteristics of that IP block. The EDA tool set executes models of parts or all of the IP block design. The EDA tool set summarizes and reports the results of the modeled behavioral characteristics of that IP block. The EDA tool set also may analyze an application's performance and allows the user to supply a new configuration of the IP block design or a functional description with new technology parameters. After the user is satisfied with the performance results of one of the iterations of the supplied configuration of the IP design parameters and the technology parameters run, the user may settle on the eventual IP core design with its associated technology parameters.

The EDA tool set integrates the results from the abstract executable representations with potentially additional information to generate the synthesis scripts for the IP block. The EDA tool set may supply the synthesis scripts to establish various performance and area goals for the IP block after the result of the overall performance and area estimates are presented to the user.

The EDA tool set may also generate an RTL file of that IP block design for logic synthesis based on the user supplied configuration parameters and implementation technology parameters. As discussed, the RTL file may be a high-level hardware description describing electronic circuits with a collection of registers, Boolean equations, control logic such as "if-then-else" statements, and complex event sequences.

In block 1210, a separate design path in an ASIC or SoC chip design is called the integration stage. The integration of the system of IP blocks may occur in parallel with the generation of the RTL file of the IP block and synthesis scripts for that IP block.

The EDA toolset may provide designs of circuits and logic gates to simulate and verify the operation of the design works correctly. The system designer codes the system of IP blocks to work together. The EDA tool set generates simulations of representations of the circuits described above that can be functionally tested, timing tested, debugged and validated. The EDA tool set simulates the system of IP block's behavior. The system designer verifies and debugs the system of IP blocks' behavior. The EDA tool set tool packages the IP core. A machine-readable storage medium may also store instructions for a test generation program to generate instructions for an external tester and the interconnect and/or power management components to run the test sequences for the tests described herein. One of ordinary skill in the art of electronic design automation knows that a design engineer creates and uses different representations, such as software coded models, to help generate tangible useful information and/or results. Many of these representations can be high-level (abstracted and with less details) or top-down views and can be used to help optimize an electronic design starting from the system level. In addition, a design process usually can be divided into phases and at the end of each phase, a tailor-made representation to the phase is usually generated as output and used as input by the next phase. Skilled engineers can make use of these representations and apply heuristic algorithms to improve the quality of the final results coming out of the final phase. These representations allow the electric design automation world to design circuits, test and verify circuits, derive lithographic mask from Netlists of circuit and other similar useful results.

In block 1215, next, system integration may occur in the integrated circuit design process. Back-end programming generally includes programming of the physical layout of the SOC such as placing and routing, or floor planning, of the circuit elements on the chip layout, as well as the routing of all metal lines between components. The back-end files, such as a layout, physical Library Exchange Format (LEF), etc. are generated for layout and fabrication.

The generated device layout may be integrated with the rest of the layout for the chip. A logic synthesis tool receives synthesis scripts for the IP core and the RTL design file of the IP cores. The logic synthesis tool also receives characteristics of logic gates used in the design from a cell library. RTL code may be generated to instantiate the SOC containing the system of IP blocks. The system of IP blocks with the fixed RTL and synthesis scripts may be simulated and verified. Synthesizing of the design with Register Transfer Level (RTL) may occur. The logic synthesis tool synthesizes the RTL design to create a gate level Netlist circuit design (i.e. a description of the individual transistors and logic gates making up all of the IP sub component blocks). The design may be outputted into a Netlist of one or more hardware design languages (HDL) such as Verilog, VHDL (Very-High-Speed Integrated Circuit Hardware Description Language) or SPICE (Simulation Program for Integrated Circuit Emphasis). A Netlist can also describe the connectivity of an electronic design such as the components included in the design, the attributes of each component and the interconnectivity amongst the components. The EDA tool set facilitates floor planning of components including adding of constraints for component placement in the space available on the chip such as XY coordinates on the chip, and routes metal connections for those components. The EDA tool set provides the information for lithographic masks to be generated from this representation of the IP core to transfer the circuit design onto a chip during manufacture, or other similar useful derivations of the circuits described above. Accordingly, back-end programming may further include the physical verification of the layout to verify that it is physically manufacturable and the resulting SOC will not have any function-preventing physical defects.

In block 1220, a fabrication facility may fabricate one or more chips with the signal generation circuit utilizing the lithographic masks generated from the EDA tool set's circuit design and layout. Fabrication facilities may use a standard CMOS logic process having minimum line widths such as 1.0 um, 0.50 um, 0.35 um, 0.25 um, 0.18 um, 0.13 um, 0.10 um, 90 nm, 65 nm or less, to fabricate the chips. The size of the CMOS logic process employed typically defines the smallest minimum lithographic dimension that can be fabricated on the chip using the lithographic masks, which in turn, determines minimum component size. According to one embodiment, light including X-rays and extreme ultraviolet radiation may pass through these lithographic masks onto the chip to transfer the circuit design and layout for the test circuit onto the chip itself.

The EDA toolset may have configuration dialog plug-ins for the graphical user interface. The EDA toolset may have an RTL generator plug-in for the SocComp. The EDA toolset may have a SystemC generator plug-in for the SocComp. The EDA toolset may perform unit-level verification on components that can be included in RTL simulation. The EDA toolset may have a test validation testbench generator. The EDA toolset may have a dis-assembler for virtual and hardware debug port trace files. The EDA toolset may be compliant with open core protocol standards. The EDA toolset may have Transactor models, Bundle protocol checkers, OCP to display socket activity, OCPPerf2 to analyze performance of a bundle, as well as other similar programs.

As discussed, an EDA tool set may be implemented in software as a set of data and instructions, such as an instance in a software library callable to other programs or an EDA tool set consisting of an executable program with the software cell library in one program, stored on a machine-readable medium. A machine-readable storage medium may include any mechanism that stores information in a form readable by a machine (e.g., a computer). For example, a machine-readable medium may include, but is not limited to: read only memory (ROM); random access memory (RAM); magnetic disk storage media; optical storage media; flash memory devices; DVD's; EPROMs; EEPROMs; FLASH, magnetic or optical cards; or any other type of media suitable for storing electronic instructions. However, a machine-readable storage medium does not include transitory signals. The instructions and operations also may be practiced in distributed computing environments where the machine-readable media is stored on and/or executed by more than one computer system. In addition, the information transferred between computer systems may either be pulled or pushed across the communication media connecting the computer systems.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. For example, the encoding and decoding of the messages to and from the CDF may be performed in hardware, software or a combination of both hardware and software. It has proven convenient at times, principally for reasons of common usage, to refer to these signals as bits, values, elements, symbols, characters, terms, numbers, or the like. While some specific embodiments of the invention have been shown the invention is not to be limited to these embodiments. The invention is to be understood as not limited by the specific embodiments described herein, but only by scope of the appended claims.

The invention claimed is:

1. An apparatus, comprising:

a sequencer-based protocol adapter configured to execute a limited instruction set, the limited instruction set comprising instructions that are executable according to different instruction sequences, wherein:

the sequencer-based protocol adapter is implemented in electronic hardware and programmable registers in an integrated circuit, the programmable registers are configured to store the instructions of the limited instruction set, the sequencer-based protocol adapter is configured to transition a set of 1) one or more voltage sources, 2) one or more frequency sources, or 3) a combination of voltage sources and frequency sources, coupled with the sequencer-based protocol adapter, the sequencer-based protocol adapter is configured to manage power on the integrated circuit when a desired performance index is received at an input and then execute one or more of the instructions stored in the programmable registers as part of an instruction sequence in order to transition the coupled frequency and/or voltage sources from a current operational state to a desired operational state, the desired operational state corresponds to the received desired performance index, the 1) one or more voltage sources, 2) one or more frequency sources, or 3) combination of voltage sources and frequency sources can be transitioned into at least three different possible operational states, and the sequencer-based protocol adapter includes an index table configured to store, for each performance index in a list of possible performance indexes, a starting address in the programmable registers for a corresponding instruction sequence of the different instruction sequences.

2. The apparatus of claim 1, wherein the index table is further configured to store, for each performance index in the list of possible performance indexes, one or more data values used to achieve a corresponding operational state, the one or more data values including a value for controlling a voltage source and/or a value for controlling a frequency source.

3. The apparatus of claim 2, wherein the starting address is stored in a first cell of the index table and each data value of the one or more data values is stored in its own cell, and wherein some performance indexes contained in the index table are associated with a same starting address but different data values.

4. The apparatus of claim 1, wherein the sequencer-based protocol adapter includes a state machine that is configured to execute the instructions stored in the programmable registers to bring the coupled frequency and/or voltage sources to a common operational state before sequencing to achieve the desired operational state corresponding to the desired performance index.

5. The apparatus of claim 1, wherein the sequencer-based protocol adapter includes an execution state machine, and wherein the sequencer-based protocol adapter is configured to supply i) a value from the index table for achieving the desired operational state through controlling a first coupled voltage or frequency source as well as ii) an order of sequenced steps, from the programmable registers and the execution state machine, needed to be followed in order to safely transition the first coupled voltage or frequency source into a new operational state.

6. The apparatus of claim 1, wherein the sequencer-based protocol adapter includes one or more outputs configured to electrically connect to control inputs of the set of frequency and/or voltage sources, wherein the sequencer-based protocol adapter is configured to drive its outputs, which connect to the control inputs of the set of frequency and/or voltage sources when executing the instruction sequence to transition to the desired operational state, and wherein the sequencer-based protocol adapter includes one or more inputs to monitor for any of i) an effect, ii) a response, or iii) a value, back from the set of frequency and/or voltage sources.

7. The apparatus of claim 1, wherein the sequencer-based protocol adapter 1) includes one or more outputs configured to electrically connect to a protocol state machine to send one or more transactions that pass a control message to control inputs of the frequency and/or voltage sources, and wherein the protocol state machine is configured to 1) receive information comprising at least i) a type of command/request with data associated with the desired operational state or ii) address locations of the frequency and/or voltage sources from the one or more outputs, and then 2) format the received information into a protocol format required to access the frequency and/or voltage sources in order to pass the control message in the protocol format to the control inputs of the frequency and/or voltage sources.

8. The apparatus of claim 1, wherein the sequencer-based protocol adapter includes a performance monitor configured to receive the desired performance index representing the desired operational state, wherein the performance monitor is configured to check for a change between a current performance index and the desired performance index, and wherein after a change in performance index is detected and prior transitions to operational states have completed, then the sequencer-based protocol adapter is configured to load instructions from the programmable registers, based on the desired operational state, that direct the sequencer-based protocol adapter to sequence various internal operations to at least one of i) generate transactions on a communication bus on the integrated circuit, or ii) take other actions to directly communicate to the frequency and/or voltage sources, and then in both cases wait for any of 1) handshake responses back from the frequency and/or voltage sources, 2) a fixed timer interval to expire, or 3) other events.

9. The apparatus of claim 1, wherein the sequencer-based protocol adapter includes an input to a performance monitor configured to receive the desired performance index from a chip level power management controller and pass the desired performance index to the index table to set the desired performance index, where then the sequencer-based protocol adapter is configured to use i) a state machine and ii) instructions and data in the programmable registers in order to transition a first coupled voltage or frequency source from the current operational state to the desired operational state in response to the desired performance index received from and set by the chip level power management controller.

10. The apparatus of claim 1, wherein the sequencer-based protocol adapter is one of a plurality of a sequencer-based protocol adapters on the integrated circuit, wherein a chip level power management controller is electrically coupled to the plurality of sequencer-based protocol adapters, wherein each sequencer-based protocol adapter is coupled to its own corresponding voltage source or frequency source located on or off the integrated circuit, and wherein each sequencer-based protocol adapter is coupled to its own corresponding voltage source or frequency source in order to direct the corresponding voltage or frequency source to the desired operational state.

11. The apparatus of claim 1, wherein the sequencer-based protocol adapter includes a performance monitor, an execution state machine, a plurality of general registers that store dynamic or constant values used in the instruction sequences, a plurality of special registers that can implement special functions, a sequencer memory, and a protocol state machine interface.

12. The apparatus of claim 1, wherein the sequencer-based protocol adapter includes an execution state machine that is configured to receive its input from a performance monitor in the sequencer-based protocol adapter, wherein the performance monitor is configured to receive the desired performance index from a chip power controller, and wherein the execution state machine is configured to go through different states to either i) execute a sequence of exit instructions to first get to a known common state prior to executing other instructions to get the coupled frequency and/or voltage sources to the desired operational state, or ii) reference one or more cells in the index table to obtain a starting address in the programmable registers for the instructions in order to fetch and then execute them in sequence to achieve the desired operational state for the coupled frequency and/or voltage sources, or iii) a combination of both steps i) and ii) above.

13. The apparatus of claim 1, wherein the sequencer-based protocol adapter is configured to provide translation between the desired performance index and a sequence of steps needed to transition the voltage and/or frequency sources to safely make a change in frequency and/or voltage level for the desired operational state without damaging or corrupting components on the integrated circuit supplied by those voltage and/or frequency sources.

14. The apparatus of claim 1, wherein a chip level power management controller is electrically coupled to the sequencer-based protocol adapter via the input in order to set the desired performance index to correspond to a booting process of i) the integrated circuit or ii) the coupled frequency and/or voltage sources, and then the sequencer-based protocol adapter is configured, upon receiving the desired performance index, to execute one or more of the instructions stored in the programmable registers to transition the coupled frequency and/or voltage sources into the desired operational state.

15. A method for creating an integrated circuit, comprising:

configuring a sequencer-based protocol adapter to execute a limited instruction set, the limited instruction set comprising instructions that are executable according to different instruction sequences;

populating the sequencer-based protocol adapter with programmable registers in the integrated circuit, the programmable registers configured to store the instructions of the limited instruction set;

configuring the sequencer-based protocol adapter to transition a set of 1) one or more voltage sources, 2) one or more frequency sources, or 3) a combination of voltage sources and frequency sources, coupled with the sequencer-based protocol adapter;

configuring the sequencer-based protocol adapter to manage power on the integrated circuit when a desired performance index is received at an input and then execute one or more of the instructions stored in the programmable registers as part of an instruction sequence in order to transition the coupled frequency and/or voltage sources from a current operational state to a desired operational state, where the desired operational state corresponds to the received desired performance index, and where the 1) one or more voltage sources, 2) one or more frequency sources, or 3) combination of voltage sources and frequency sources can be transitioned into at least three different possible operational states; and configuring the sequencer-based protocol adapter to include an index table configured to store, for each performance index in a list of possible performance indexes, a starting address in the programmable registers for a corresponding instruction sequence of the different instruction sequences.

16. The method of claim 15, wherein the index table is further configured to store, for each performance index in the list of possible performance indexes, one or more data values used to achieve a corresponding operational state, the one or more data values including a value for controlling a voltage source and/or a value for controlling a frequency source.

17. The method of claim 15, further comprising:

configuring the sequencer-based protocol adapter to include a state machine that is configured to execute the instructions stored in the programmable registers to bring the coupled frequency and/or voltage sources to a common operational state before sequencing to achieve the desired operational state corresponding to the desired performance index.

18. The method of claim 15, further comprising:

configuring the sequencer-based protocol adapter to include an execution state machine; and configuring the sequencer-based protocol adapter to supply i) a value from the index table for achieving the desired operational state through controlling a first coupled voltage or frequency source as well as ii) an order of sequenced steps, from the programmable registers and the execution state machine, needed to be followed in order to safely transition the first coupled voltage or frequency source into a new operational state.

19. The method of claim 15, further comprising:

configuring the sequencer-based protocol adapter to include one or more outputs to electrically connect to control inputs of the set of frequency and/or voltage sources;

configuring the sequencer-based protocol adapter to drive its outputs, which connect to the control inputs of the set of frequency and/or voltage sources when executing the instruction sequence to transition to the desired operational state; and configuring the sequencer-based protocol adapter to include one or more inputs to monitor for any of i) an effect, ii) a response, or iii) a value, back from the set of frequency and/or voltage sources.

20. A non-transitory machine-readable medium having data and instructions stored thereon, wherein the data and instructions implement an Electronic Design Automation toolset, and wherein when executed by a machine, the instructions cause the machine to generate a representation of the integrated circuit created by the method of claim 15.

* * * * *